United States Patent [19]

Weber et al.

[11] Patent Number: 4,705,826
[45] Date of Patent: Nov. 10, 1987

[54] PROCESS FOR THE PREPARATION OF POLY(DIORGANOSILOXANES) WITH ALKOXY END GROUPS

[75] Inventors: Wilhelm Weber, Cologne; Karl H. Sockel; Theo Achtenberg, both of Leverkusen; Hans Sattlegger, Odenthal, all of Fed. Rep. of Germany

[73] Assignee: Bayer Aktiengesellschaft, Leverkusen, Fed. Rep. of Germany

[21] Appl. No.: 872,989

[22] Filed: Jun. 11, 1986

[30] Foreign Application Priority Data

Jun. 28, 1985 [DE] Fed. Rep. of Germany ....... 3523206

[51] Int. Cl.[4] .............................................. C08L 83/04
[52] U.S. Cl. .................................. 524/860; 524/588; 524/788; 524/789; 524/859; 528/21; 525/474
[58] Field of Search ........................ 528/21; 525/474; 524/588, 788, 789, 860, 859

[56] References Cited

U.S. PATENT DOCUMENTS

| Re. 29,760 | 9/1978 | Brown et al. | |
|---|---|---|---|
| 2,909,549 | 10/1959 | Bailey | 260/448.8 |
| 3,296,195 | 1/1967 | Goossens | 260/46.5 |
| 4,486,567 | 12/1984 | Bowman et al. | 528/21 |

FOREIGN PATENT DOCUMENTS

| 0021859 | 1/1981 | European Pat. Off. |
|---|---|---|
| 0070786 | 1/1983 | European Pat. Off. |
| 0069256 | 1/1983 | European Pat. Off. |
| 0088377 | 9/1983 | European Pat. Off. |
| 0098369 | 1/1984 | European Pat. Off. |
| 1247646 | 8/1967 | Fed. Rep. of Germany |

OTHER PUBLICATIONS

"Methoden der Organischen Chemie", Houben–Weyl, Band E4, 4th edition, 1983, p. 142.

*Primary Examiner*—Melvyn I. Marquis
*Attorney, Agent, or Firm*—Sprung Horn Kramer & Woods

[57] ABSTRACT

A process for the preparation of triorganooxysilyl- or diorganooxyorganosilyl-terminated poly(diorganosiloxanes) or formulations containing such siloxanes comprising reacting $\alpha,\omega$-dihydroxypoly(diorganosiloxanes) with tetraorganyloxysilanes or triorganyloxyorganosilanes in the presence of an ammonium carbamate catalyst of the formula I

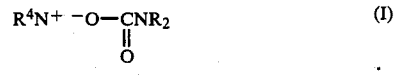

wherein, R represents a hydrocarbon radical with 1–20 C atoms or an H atom, and where identical or different R radicals are in the molecule.

The products produced by this process can be employed in the preparation of one-component silicone paste which harden into elastomers in the presence of moisture.

12 Claims, No Drawings

PROCESS FOR THE PREPARATION OF POLY(DIORGANOSILOXANES) WITH ALKOXY END GROUPS

BACKGROUND OF THE INVENTION

The invention relates to the preparation of poly(diorganosiloxanes) with diorganooxy-organosilyl or triorganooxysilyl end groups by reaction of α,ω-dihydroxypoly(diorganosiloxanes) with alkoxysilanes in the presence of catalytically active ammonium carbamates.

Several processes are already known for the preparation of the polymers according to the invention or of formulations containing such polymers. The products are used for the preparation of one-component silicone pastes which harden into elastomers in the presence of moisture, hereinafter termed "1C RTV pastes".

In U.S. Pat. No. 3,161,614 the reaction of α,ω-dihydroxy(polydiorgano)siloxanes with multifunctional halosilanes, e.g., $SiCl_4$ or $CH_3SiCl_3$ is described. The halogen-containing polysiloxanes resulting therefrom are then converted into di- or triorganooxy silyl-terminated polysiloxanes by alcohols in the presence of acid scavengers.

In the same patent the reaction of α,ω-dihydroxypoly(diorganosiloxanes) with alkoxysilanes in the presence of suitable catalysts such as amines and metal carboxylates is also mentioned.

In European Patent Specification No. 21859 and in European Patent Specification No. 69256 the preparation of 1C RTV pastes is described. According to these publications α,ω-dihydroxypoly(diorganosiloxanes) can be reacted with alkoxysilanes in the presence of amines to form the polymers according to the invention.

In European Patent Specification No. 70786 the use of hydroxylamine derivatives instead of amines as catalysts is described.

Furthermore, mixed-functional silanes have become known which, in contrast to pure organyloxy or organyloxyorganosilanes, can be reacted with α,ω-dihydroxylpoly(diorganosiloxanes) even without using catalysts to form the polysiloxanes prepared according to the invention. These include alkoxyamidosilanes (German Patent Specification No. 1 247 646), alkoxyoximinosilanes (European Patent Specification No. 98369 and alkoxyacetoxysilanes (U.S. Pat. No. 3,296,195).

All the processes described hitherto for the preparation of the polysiloxanes mentioned have disadvantages. The process of reacting α,ω-dihydroxypoly(diorganosiloxanes) with halosilanes with subsequent alcoholysis (U.S. Pat. No. 3,161,614) results in polymers which contain ammonia salts with a corrosive action and is long-winded. The success of the process mentioned in the same document of reacting α,ω-dihydroxypoly(diorganosiloxanes) with alkoxysilanes in the presence of amine catalysts depends essentially on the base strength of the catalyst used. The catalytic effectiveness of the amines increases with the base strength, but so also does the tendency for undesired polymer rearrangements. Thus, for example, it is known for strong bases such as KOH or potassium siloxanolates (U.S. Pat. No. 2,909,549) that with cyclotetra(dimethylsiloxane) they result in monoorganyloxy-terminated poly(diorganosiloxanes). In a similar manner, from α,ω-dihydroxypoly(diorganosiloxanes) and alkoxysilanes in the presence of KOH branched polysiloxanes are rapidly produced which have monoorganyloxydiorganosilyl end groups. No serviceable 1C RTV pastes can be prepared from such polysiloxanes. In the case of amines there is apparently a restriction to mono- and dialkylamines which represent a compromise between the activity of the catalyst in relation to the desired termination process and the undesired rearrangement. However, in the presence of dialkylamines, the reaction of the OH end groups only proceeds sufficiently rapidly if particularly reactive silanes are employed. Otherwise the formulations must be kept for a rather long time at elevated temperature, which represents a disadvantage in the practical application of the preparation of 1C RTV pastes.

The catalysis mentioned in U.S. Pat. No. 2,909,549 of the reaction of α,ω-dihydroxypoly(diorganosiloxanes) with alkoxysilanes by metal carboxylates such as diorganotin dicarboxylates, has proved quite unsuitable for the practical application of preparing 1C RTV pastes since pastes prepared in this manner exhibit crosslinking phenomena during the preparation or storage of the products.

Although the hydroxylamine derivatives described as catalysts in European Patent Specification 70786 have an improved activity compared with mono- and dialkylamines, in many cases, however, they result, after formulation to form 1C RTV systems, in coloration phenomena and have to be removed from the system.

Mixed-functional alkoxysilanes which carry an amido, amino, oximino or carboxylate radical in addition to the alkoxy groups yield, with α,ω-dihydroxypoly(diorganosiloxanes) precisely the desired poly(diorganosiloxanes) with triorganooxysilyl or diorganooxyorganosilyl end groups. The preparation of the silanes is, however, usually expensive and the removal of the fission products makes special process steps necessary in the preparation of the formulations or cannot be carried out in practice. The removal of the fission products resulting from the silanes mentioned would, however, be desirable, for example for the formulation of chemically neutral, transparent systems.

SUMMARY OF THE INVENTION

It has now been found that triorganooxysilyl- or diorganooxyorganosilyl-terminated poly(diorganosiloxanes) or formulations containing such siloxanes can be prepared from α,ω-dihydroxypoly(diorganosiloxanes) and tetraorganooxysilanes or triorganooxyorganosilanes if ammonium carbamates of the formula I

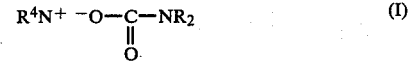

are used as catalysts, where R denotes a hydrocarbon radical with up to 20 C atoms or an H atom and identical or different R radicals may be present in the molecule.

Hydrogen and methyl groups are preferred as R radicals.

It is surprising that when the catalysts I are used, less drastic conditions are necessary than for the amines described above as catalysts. It is furthermore surprising that in the presence of the carbamates I interfering polymer rearrangements which produce monoorganooxydiorganosilyl end groups are absent.

DETAILED DESCRIPTION OF THE INVENTION

For the process according to the invention all known α,ω-dihydroxypoly(diorganosiloxanes) are suitable, the organyl radicals preferably being methyl radicals. As a further example, mixed methylphenylpolysiloxanes may be mentioned.

For the reaction with the α,ω-dihydroxypoly(diorganosiloxanes) compounds of the type II:

$$R^1{}_m Si(OR^2)_{4-m}, \quad (II)$$

are suitable, where $R^1$ may be a saturated or unsaturated hydrocarbon radical. The molecule may contain different $R^1$ radicals. The index m is 0 or 1.

For $R^1$ methyl, ethyl, vinyl or propenyl groups are preferred.

The ammonium carbamates suitable as catalysts can be obtained most simply by reaction of amines with carbon dioxide (H. Hagemann and U. Petersen, "Carbamidsauren und deren Salze" ("Carbamic Acids and their Salts") in Houben-Weyl, Methoden der organischen Chemie (Methods of Organic Chemistry), Georg Thieme Verlag, Stuttgart-New York, 4th edition, 1983, vol. E4, page 142 or European Patent Specification No. 88377).

The process according to the invention is carried out at room temperature or somewhat above it if the reactivity of the silane used permits it. Preferred are temperatures below 100° C. The process may, for example, be carried out in a manner such that 100 parts of a dihydroxypoly(diorganosiloxane) are mixed with 0 to 100 parts of an α,ω-bis(trimethylsiloxy)poly(diorganosiloxane) and 0 to 400 parts of a filler, that 0.02 to 2 parts of a catalyst of composition I $$R^4N^+ \ {}^-O-\underset{\underset{O}{\|}}{C}-NR_2 \quad (I)$$

is added and that 1 to 20 parts of a silane II $$R^1{}_m Si(OR^1)_{4-m}, \quad (II)$$

is added, where the R and $R^1$ radicals and the index m are as defined above.

The reaction can be carried out in boilers or in mixing units such as planetary mixers, dissolvers and in continuously operating mixers.

Fillers may be added to the formulations to be prepared according to the invention. These include, for example, fumed or precipitated silica, ground quartz or cristobalite, natural or precipitated carbonates such as chalk and dolomite, silicates such as wollastonite, mica, talc, or powdered slate, and also soot and organic polymeric fillers. If the formulation is later to be used as a 1C RTV paste, the filler is expediently mixed in before the beginning or during the process step according to the invention, since in this manner the moisture adhering to the fillers can react with the organooxysilanes simultaneously with the formation of the desired termination. In the case of fumed silica with large surface area, the SiOH groups located on the filler surface should also be saturated. The two last named processes may be important for the formulation of a 1C RTV paste which is stable during storage.

The formulations obtained by the process according to the invention may furthermore contain α,ω-bis(trimethylsiloxy)poly(diorganosiloxanes) as softeners.

For use as a 1C RTV paste further auxiliary substances may be added to the products prepared according to the invention. These include crosslinking catalysts such as tin and titanium compounds or amines. Mixtures of these catalysts may also find application. Furthermore additives which improve the adhesion may be used, in particular those silanes known as adhesive agents which carry functional radicals which are linked via hydrocarbon radicals to the silicone atoms, e.g., $$H_2NCH_2-CH_2-CH_2-Si(OC_2H_5)_3,$$

$$H_2N-CH_2-CH_2-NH-CH_2-CH_2-CH_2-Si(OCH_3)_3 \text{ or}$$

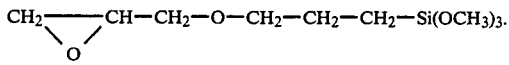

According to a preferred embodiment, methoxysilanes such as vinyltrimethoxysilane, methyltrimethoxysilane or tetramethoxysilane are used as organooxysilanes. The reactivity of these silanes in the presence of the carbamate catalysts described is sufficient to cause the reaction with α,ω-dihydroxypoly(diorganosiloxanes) to proceeed virtually quantitatively at room temperature or slightly above it within a short time. The removal of the alcohol produced in the process described may be of advantage for the use as a 1C RTV paste. As carbamate catalysts those compounds I are preferred which contain methyl groups or methyl groups and hydrogen atoms as the R radicals, e.g. $(CH_3)_2NH_2OCON(CH_3)_2$. In vacuum the amines produced therefrom under the action of heat can easily be removed because of the low boiling points.

It is now intended to explain the process according to the invention in more detail by reference to the following examples.

EXAMPLE 1

100 parts by weight of an α,ω-dihydroxypoly(dimethylsiloxane) of mean chain length 20 were mixed with 38 parts by weight of vinyltrimethoxysilane and 1.35 parts by weight of dimethylammonium-N,N-dimethylcarbamate. After 15 minutes the methanol produced and unreacted silane were removed at 1 mbar and with slow heating to 70° C. From the $^1H$ NMR spectrum of the product a reaction to more than 95% could be deduced. An SiOH signal was no longer detectable.

EXAMPLE 2 (comparison)

As Example 1, but using 1.3 parts by weight of dibutylamine instead of dimethylammonium-N,N-dimethylcarbamate. After removal the volatile components in vacuo at 70° C. a $^1H$ NMR spectrum of the residue still exhibited a clear SiOH signal.

EXAMPLE 3

100 parts by weight of an α,ω-dihydroxypoly(dimethylsiloxane) with a viscosity of 50 Pa.s were mixed in a planetary mixer with 39 parts by weight of an α,ω-bis(trimethylsiloxy)poly(dimethylsiloxane) with a viscosity of 1 Pa.s, 0.7 parts by weight of dimethylammonium-N,N-dimethylcarbamate, 6.5 parts by weight of vinyltrimethoxysilane and 15 parts by weight of a hydrophobic fumed silica acid with a B.E.T. surface area of 110 m²/g in the specified sequence. After stirring for 15 minutes 0.065 parts by weight of dibutyltin dilaurate were added and the paste was loaded into cartridges sealed against water vapor. Samples of the material were pulled out into sheets and tested in accordance with DIN 53 504 after hardening for 14 days at 25° C. and 50% relative air humidity.

Ultimate elongation: 550%
Tensile strength: 1.1N/mm²
Modulus of elasticity F: 0.3N/mm²

The product left in the cartridges was not crosslinked after 4 weeks of storage. After squirting out it hardened under the influence of the atmospheric moisture into an elastomer which had similar mechanical properties to the sample extruded immediately.

EXAMPLE 4

Example 3 was repeated without using the carbamate. The paste was loaded into cartridges and cured with atmospheric moisture excluded within one day.

EXAMPLE 5

Example 3 was modified in a manner such that instead of the carbamate 0.05 parts by weight of potassium hydroxide were used. Before being added the potassium hydroxide was dissolved in the vinyltrimethoxysilane. The final paste did not cure in air to form an elastomer.

EXAMPLE 6

Example 4 was modified in a manner such that instead of the carbamate 0.7 parts by weight of bibutylamine were used. The paste already began to crosslink in the mixer after the tin catalyst was added.

EXAMPLE 7

Example 3 was modified in a manner such that instead of the dibutyltin dilaurate, 0.8 parts by weight of a titanium compound were used which had the following composition:

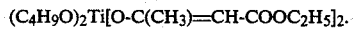

$(C_4H_9O)_2Ti[O-C(CH_3)=CH-COOC_2H_5]_2$.

The vulcanized product had the following mechanical properties:
Ultimate elongation: 590%
Tensile strength: 1.5N/mm²
Modulus of elasticity E: 0.3N/mm²

The paste was still usable after 14 weeks of storage.

EXAMPLE 8

A 1C RTV paste was prepared in a planetary mixer. 353.5 g of an α,ω-dihydroxypolydimethylsiloxane (viscosity 50 Pa.s) were mixed with 210 g of a bis(trimethylsiloxy)polydimethylsiloxane (viscosity 1 Pa.s), 28 g of methyltrimethoxysilane and 2.8 g of dimethylammonium-N,N-dimethylcarbamate. After 10 minutes 84 g of a hydrophobic fumed silica (B.E.T. surface area 110 m²/g) were added. 20 minutes later the mixture was heated to 70° C. and a vacuum was applied. After the volatile components had been removed in this way the mixture was cooled to 40° C. 18.9 g of methyltrimethoxysilane, 5.6 g of 3-aminopropyltriethoxysilane and 2.1 g of a 65% strength solution of dibutyltin bis(2-ethylhexanoate) in toluene were added, the mixture was degassed briefly in vacuo and then loaded into cartridges.

2 mm thick test sheets were produced at 23° C. and 50% rel. atmospheric humidity. After hardening for 7 days the following mechanical properties were determined:

Modulus at 100% elongation: 0.48N/mm²
ultimate elongation: 560%
tensile strength: 1.75N/mm²
hardness: 22 Shore A Approximately 10 mm thick bands were applied to glass, tile, aluminium, copper and polycarbonate sheets. After hardening for 7 days at 23° C. and 50% rel. atmospheric humidity the samples were placed in water for a further 7 days. None of the bands broke a subsequently being pulled from the substrate but all of the cracks were cohesive.

It will be appreciated that the instant specification and claims are set forth by way of illustration and not limitation, and that various modifications and changes may be made without departing from the spirit and cope of the present invention.

We claim:

1. A process for the preparation of a triorganooxysilyl- or a diorganooxyorganosilyl-terminated poly(diorganosiloxane) of a formulation containing such siloxane comprising reacting a α,ω-dihydroxypoly(diorganosiloxane) with a tetraorganooxysilane or triorganooxyorganosilane in the presence of an ammonium carbamate catalyst of the formula (I)

$$R_4N^+ \; {}^-\!OCNR_2 \atop \underset{O}{\|} \qquad (I)$$

wherein R represents a hydrocarbon radical with 1 to 20 C atoms or an H atom, and where identical or different R radicals are in the molecule.

2. A process according to claim 1, wherein the reaction is carried out in the presence of a filler.

3. A process according to claim 2, wherein said filler are selected from the group consisting of fumed silica, precipitated silica, ground quartz, ground cristobalite, natural carbonates, precipitated carbonates, silicates, soot and organic polymeric fillers.

4. A process according to claim 2, wherein said filler is selected from the group consisting of chalk, dolomite, wollastonite, mica, talc and powdered slate.

5. A process according to claim 1, wherein the α,ω-dihydroxypoly(diorganosiloxane) is reacted with a compound of the formula

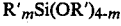

$R'_m Si(OR')_{4-m}$ wherein, R' is a saturated or unsaturated hydrocarbon radical and m is 0 or 1.

6. A process according to claim 5, wherein R¹ is selected from the group consisting of methyl, ethyl, vinyl and propenyl.

7. A process according to claim 1, wherein the reaction is carried at a temperature below 100° C.

8. A process according to claim 1, wherein for 100 parts of a dihydroxypoly(diorganosiloxane) are mixed 0 to 100 parts of an α,ω-bis(trimethylsiloxy) poly(diorganosiloxane), 0 to 400 parts of a filler, 0.02 to 2 parts of said catalyst and 1 to 20 parts of a silane, of the formula II, $R^1_m Si(OR^1)_{4-m}$, where $R^1$ is a saturated or unsaturated hydrocarbon radical and m is 0 or 1.

9. A process according to claim 1, wherein a methoxysilane is reacted with the α,ω-dihydroxypoly(diorganosilane).

10. A process according to claim 9, wherein said methoxysilane is selected from the group consisting of vinyltrimethoxysilane, methyltrimethoxysilane and tetramethoxysilane.

11. A process according to claim 1, wherein the catalyst contains as R methyl groups and hydrogen atoms.

12. A process according to claim 1, wherein the catalyst is $(CH_3)_2NH_2OCON(CH_3)_2$.

* * * * *

UNITED STATES PATENT AND TRADEMARK OFFICE
CERTIFICATE OF CORRECTION

PATENT NO. : 4,705,826

DATED : November 10, 1987

INVENTOR(S) : Wilhelm Weber, et al.

It is certified that error appears in the above-identified patent and that said Letters Patent is hereby corrected as shown below:

Col. 1, line 22    Correct --triorganooxysilyl--
Col. 3, line 12    Delete "(OR$^2$)" and substitute --(OR$^1$)--
Col. 4, line 57    After "After" insert --the--
Col. 4, line 57    After "removal" insert --of--
Col. 5, line 11    Delete "F" and substitute --E--
Col. 6, line 18    Delete "cope" and substitute --scope--
Col. 6, line 39    Delete "are" and substitute --is--
Col. 6, line 50    Delete formula and substitute:

$$--R^1_m Si(OR^1)_{4-m}--$$

Signed and Sealed this

Second Day of August, 1988

Attest:

DONALD J. QUIGG

Attesting Officer     Commissioner of Patents and Trademarks